April 27, 1926. 1,582,539
S. A. RICHARDSON
BRAKE RETAINER VALVE MECHANISM
Filed July 31, 1922   2 Sheets-Sheet 1
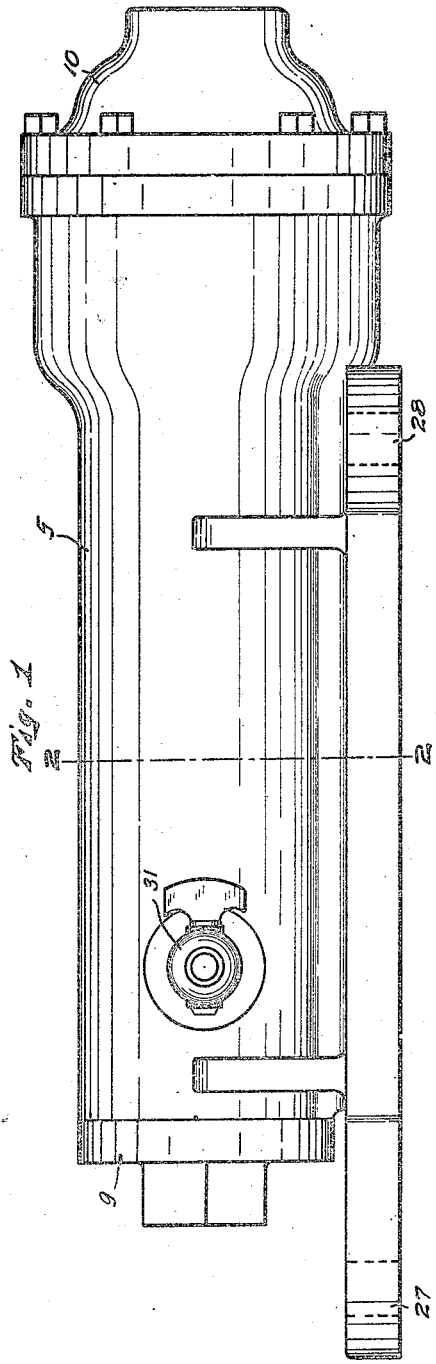
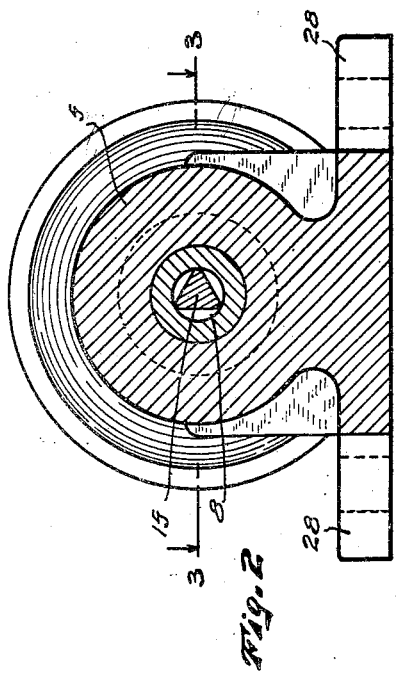
INVENTOR
*Sabert A. Richardson*
BY
*G. Wright Arnold*
ATTORNEY

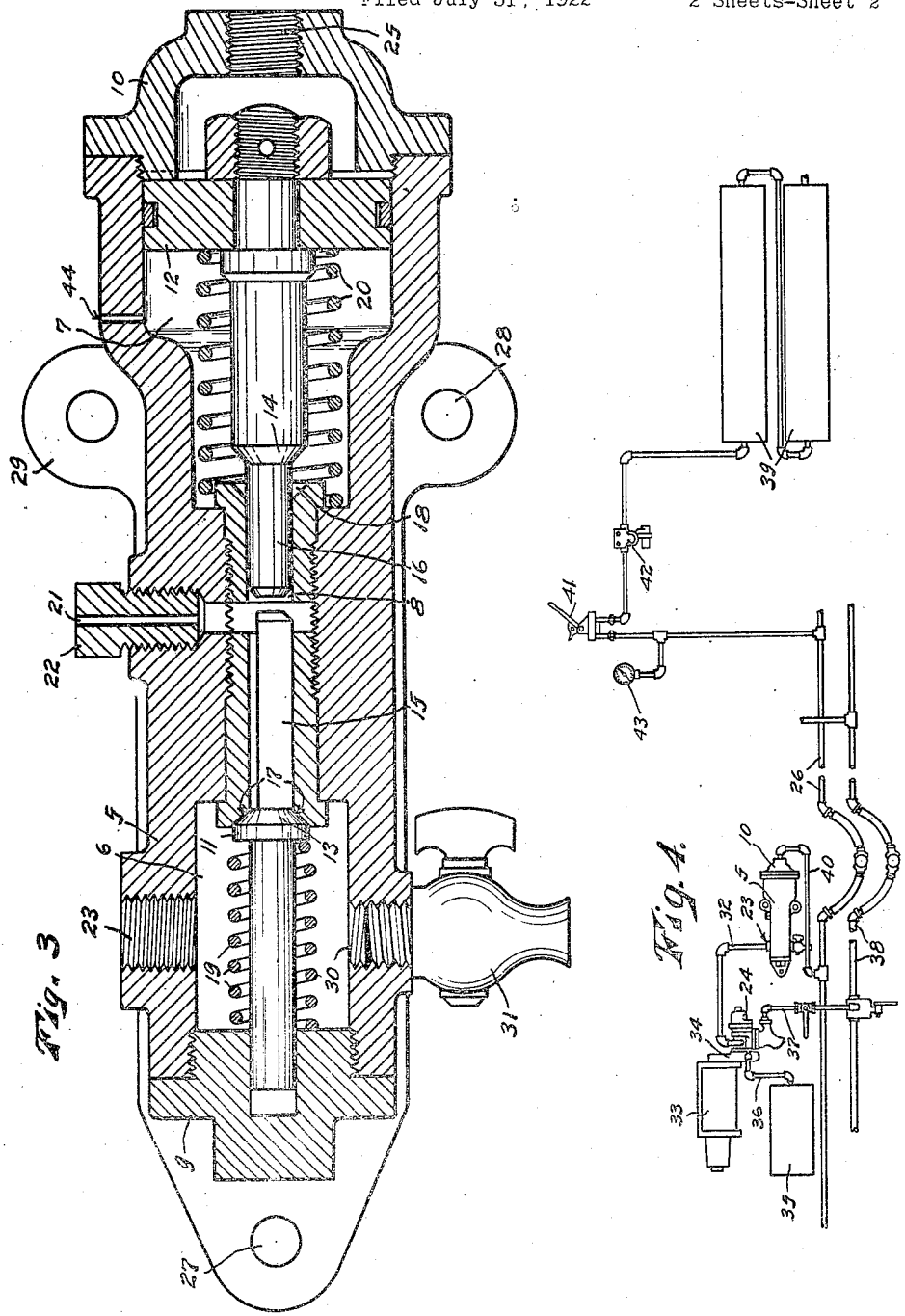

Patented Apr. 27, 1926.

1,582,539

UNITED STATES PATENT OFFICE.

SABRET A. RICHARDSON, OF SEATTLE, WASHINGTON.

BRAKE-RETAINER-VALVE MECHANISM.

Application filed July 31, 1922. Serial No. 578,640.

*To all whom it may concern:*

Be it known that I, SABRET A. RICHARDSON, a citizen of the United States, residing at Seattle, in the county of King and State of Washington, have invented a certain new and useful Brake-Retainer-Valve Mechanism, of which the following is a specification.

My invention relates to brake-retainer valve mechanism.

In logging operations the trains on which the logs are hauled operate on very steep grades, which grades often are very long in length, sometimes continuing for ten miles or more and require the continued application of the brakes for said ten miles. The ordinary air brake equipment is not adapted for said long service because the air gradually leaks out and the pressure in the auxiliary is insufficient to maintain the brakes in applied position for the said necessary long period of time indicated. The problem presented is as follows: When the brakes are set by the engineer, the compressed air in the auxiliary reservoirs can only hold the brake in an applied position for a relatively short time owing to said leakage. The engineer after applying the brakes moves the throttle into what is known as "lap" position. This means that the supply of air from the main reservoirs is stopped. The air in the auxilary reservoir originally at ninety pounds pressure gradually leaks away so that the said pressure is ineffective in maintaining the brakes in applied position. As the brake system is now arranged the engineer is unable to supply air to the auxiliary reservoirs to replace the escaped air and thus to nullify the decreasing pressure. He cannot supply the air pressure to them while the air brakes are in applied position. Therefore when the engineer shifts his control lever to supply air to the auxiliary reservoirs and renew the pressure therein, thereupon he automatically releases the brakes from their applied position against the wheels. The period for recharging the auxiliary tanks varies with the number of cars and the engine air capacity. However for fifteen cars, three to five minutes is a very conservative period for said purpose. Obviously, during this period the train is without any brakes in applied position and manifestly on the long steep slopes the very heavy train loaded as it is with large logs gives such a momentum that when the brakes are applied they are of little effect. In short, the brakes must be kept in applied position continuously and no release permitted, even momentarily, to say nothing of a period of from three to five minutes. The lack of provision for maintaining the brakes in applied position while recharging the auxiliary reservoirs has resulted in a great many wrecks, involving serious accidents and loss of life, to omit mention of the great loss of property in the form of railroad equipment and otherwise.

To overcome the shortcomings of the ordinary brake system as above described there has been an attempt to remedy the same by providing what is known as a retainer valve which is applied to the exhaust port of the triple valve, whereby the air upon exhausting from the brake cylinder is arrested in its escape and therefore retains the brakes in applied position with the feeble pressure so long as any pressure remains in said cylinder, but of course with decreasing effectiveness. These valves are manually operated. On a very long train an operator starts out from each end of the train to move these valves on each car into closed position on the beginning of the descent. These valves operate to hold the brakes in applied position so that after they are once set, the setting is continued for a period until the pressure in the brake cylinders is exhausted. In the meantime, the engineer re-supplies the auxiliary reservoirs. The descent of what is called the logging line to the main railroad line may involve several downgrades and with some upgrades or level stretches. When the descent for a particular grade is accomplished or an ascent or even a level stretch is made, the operators start out anew from each end of the train and move the said retainer valves into open position. Manifestly, any such practice is expensive, slow and cumbersome. During the total descent of the logging line the said retainer valves must often be operated two or more times. This involves a loss of from twenty to forty minutes in running time.

In general the objects of my invention are to provide a brake retainer valve mechanism which overcomes the objections above set forth.

The primary object of my invention is to provide a brake-retainer valve mechanism whereby the reduction of pressure in the brake cylinder may be subjected to control. A further primary object of my invention is to provide a brake-retainer valve mechanism the operation of which is positive in its action. And a still further primary object of my invention is to provide such a brake-retainer valve mechanism, the operation of which will be simultaneous on all the cars of the train.

In general I accomplish these objects by providing a valve to regulate the time and rate of exhausting of the air from the brake cylinder and by providing means for controlling said valve which is subject to control by the engineer in the engine cab.

The above mentioned general objects of my invention together with others inherent in the same are attained by the mechanism illustrated in the following drawings, the same being merely preferred exemplary forms of embodiment of my invention, thruout which drawings like reference numerals indicate like parts:

Figure 1 is a view in side elevation of a retainer-valve embodying my invention;

Fig. 2 is a view in cross-section on line 2, 2, of Fig. 1;

Fig. 3 is a view in longitudinal section on line 3, 3 of Fig. 2; and

Fig. 4 is a diagrammatic view of the main reservoirs, reducing valve control, brake cylinder, auxiliary reservoir, triple valve and air line connections for the same, as well as the retainer valve embodying my invention and the air line connections for the same.

A valve casing 5 is provided with chambers 6 and 7 at each end thereof with a connecting recess 8 therebetween. The cap 9 closes the end of chamber 6 while the cap 10 closes the chamber 7, said caps being preferably provided with threaded portions for releasably securing the same to said housing. Said chambers are respectively provided with pistons 11 and 12 which carry valve members 13 and 14, which members have the engaging rods 15 and 16 respectively. The said valve members 13 and 14 seat upon valve seats 17 and 18 disposed on casing 5. Each of said pistons are provided with springs 19 and 20, the first of said springs normally holding valve 13 in seated or closed position while spring 20 normally maintains valve 14 in unseated position. Piston 20 is preferably of larger dimension than piston 11 so that it may at all times, when air pressure is admitted to retainer line 26, positively overcome the force of the spring 19 and air pressure which may be operating to close valve 13. In the casing 5, an exhaust port 21, communicating with recess 8 is provided intermediate the length of the valve or said casing. This port is preferably disposed in a plug 22 so that various sized exhaust ports may be provided by simply substituting for this plug other plugs having larger or smaller sized ports extending longitudinally therethrough. Also in said casing 5, a port 23 is provided for connecting the said valve to the triple valve 24 of the regular air brake system with which said retainer valve mechanism embodying my invention is to be associated. In the cap 10 a port 25 is provided for connecting said retainer valve mechanism to the retainer compressed air line 26 which line is specially added to the ordinary air brake mechanism as a part of my invention. Lugs 27, 28 and 29 are provided for securing the casing 5 to a suitable support as may be desired, or any other suitable mounting means may be employed. A port 30 is preferably provided for affording a manually controlled retainer valve or pet-cock 31.

A pipe 32 connects port 23 with the triple valve 24. The said triple valve 24 has its regular connections with the brake cylinder 33 by means of pipe 34. Also said triple valve 24 is connected to the auxiliary reservoir 35 by pipe 36. Said triple valve also has the pipe 37 connecting it to the brake pipe line 38 which line has its regular connections to the main reservoirs 39 said connections and associated members, such as controlling means not being shown herein. The port 25 of the retainer valve casing 5 has pipe 40 connecting it to the retainer compressed air line 26 which has its controller 41, reducing valve 42 and pressure gauge 43, said line being also connected to the said main reservoirs 39. Vent port 44 is preferably provided in casing 5.

The mode of operation of a brake retainer valve mechanism embodying my invention is as follows:

Upon setting the brakes the engineer or operator in the engine cab moves the brake control lever (not shown) into a position permitting the air to escape in part from the brake line 38 which permits the air in the auxiliary reservoir 35 to close the port in the triple valve 24 between said auxiliary reservoir 35 and said brake line 38 and opens the port between auxiliary reservoir 35 and the brake cylinder 33. As the pressure in said brake cylinder 33 rises, the brakes are set. When it becomes necessary by gradual leakage to re-charge the auxiliary reservoir 35 the operator moves the control lever (not shown) of the main brake line 38 into a position which causes the pressure to rise in the said line 38 which thereupon actuates the triple valve 24 whereby the port between the auxiliary reservoir 35 and the cylinder 33 is closed and the port between the brake line 38 and the auxiliary reservoir 35 opened, establishing connection between the main brake line 38 and said auxiliary reservoir 35. At the same time the triple valve 24 opens a port which would permit the air to exhaust from the brake cylinder 33. Up to this point this is the operation of the ordinary brake system. Instead of permitting the air from said brake cylinder 33 to exhaust into the atmosphere, I cause the said air to enter the brake retainer valve casing 5 through port 23. The pressure of this exhausting air immediately closes or cooperates with spring 19 to maintain in closed position the valve 13. Thus, the brakes are not allowed to be released as they ordinarily would when it becomes necessary to charge the auxiliary reservoir 35. When finally it is desired to release the brakes the engineer or operator in the engine cab moves controller 41 into a position which permits the pressure of the main reservoir 39 to be transmitted to the piston 12 through the retainer compressed air line 26. Obviously, this actuates piston 12 which causes its valve rod 16 to strike against the valve rod 15 of piston 11. Since the pressure of the main reservoir is greater than that of the brake cylinder 33 the result is the pushing back of piston 11 and opening the valve 13 whereby the air from said brake cylinder 33 is permitted to escape through the recess 8 to the exhaust port 21 and thereby release the brakes. The piston 12 is preferably made larger than the piston 11 which also insures the overcoming of any pressure operating to hold valve 13 in closed position against valve seat 17. It will be noted that such an arrangement permits of the release of the brakes as gradually as the operator may wish. Also be it noted, that the equalizing spring 20 maintains the valve 14 in open position with such force as to permit the pressure in the retainer compressed air line 26 to rise to such a degree that the piston 12 of the brake retainer valve of each and every car will be actuated at the same time to open the piston 11. The gauge 43 permits the operator to know just what pressure he is admitting to the retainer compressed air line. Thus, the equalizing spring 20 assists in providing a positive control. During the descent as the air pressure gradually becomes reduced in the brake cylinder the engineer may re-supply the same from the auxiliary reservoir 35 which has been recharged in the meantime by operating the ordinary brake mechanism for brake setting position (reduction of pressure in brake line). In this manner it is manifest that the brakes may be maintained in a set position or in such degree of applied position for such period of time as the engineer may desire. The vent port 44 is preferably provided to insure against the creating of any back pressure in chamber 7 by reason of the escape of air about piston 12 which back pressure might, in conjunction with the spring 20, cause the piston 12 to move its valve 14 from the valve seat 18 prematurely thereby preventing the releasing of the brakes as completely as the engineer might desire.

Obviously, changes may be made in the forms, dimensions, and arrangement of the parts of my invention, without departing from the principle thereof, the above setting forth only preferred forms of embodiment. Clearly, spring 17 may be utilized to function also as an equalizing spring and spring 20 omitted. The valve rods 15 and 16 may be formed integrally. Since there is but a very small movement of piston 12 necessary to unseat the valve 13, the common diaphragm valve could be substituted for said piston 12.

I claim:

1. In combination with a railroad car compressed fluid brake mechanism, a retainer compressed air line in addition to the main air line; a brake retainer valve embodying a valve means in each end thereof, valve seats oppositely disposed to register with said means, a brake mechanism communicating port in one end of said valve, a retainer air line communicating port in the opposite end of said valve, and a resilient means operatively disposed with respect to said valve means in said retainer air line end of said valve, said resilient means being characterized by being only of such strength as to maintain the associated valve means in open position during the filling of the retainer air line with compressed fluid.

2. In combination with a railroad car compressed fluid brake mechanism, a retainer compressed air line in addition to the main air line; a brake retainer valve embodying separate and independently operable valve means in each end thereof, valve seats oppositely disposed to register with said means, a brake mechanism communicating port in one end of said valve, a retainer air line communicating port in the opposite end of said valve, and a resilient means operatively disposed with respect to said valve means in said retainer air line end of said valve, said resilient means being characterized by being only of such strength as to maintain the associated valve means in open position during the filling of the retainer air line with compressed fluid.

3. The method of releasing the brakes of a railroad compressed fluid brake mechanism by means of a brake retainer valve and a separate retainer air line valve communicating with said retainer valve of introducing compressed fluid in said retainer air line only during the period of exhausting the air in the brake cylinder.

In witness whereof, I hereunto subscribe my name this 25th day of July, A. D. 1922.

SABRET A. RICHARDSON.